(12) United States Patent
Gambhir-Parekh

(10) Patent No.: US 11,496,441 B2
(45) Date of Patent: Nov. 8, 2022

(54) NETWORK ADDRESS TRANSLATION WITH TEID

(71) Applicant: Parallel Wireless, Inc., Nashua, NH (US)

(72) Inventor: Manisha Sameer Gambhir-Parekh, Pune (IN)

(73) Assignee: Parallel Wireless, Inc., Nashua, NH (US)

( * ) Notice: Subject to any disclaimer, the term of this patent is extended or adjusted under 35 U.S.C. 154(b) by 40 days.

(21) Appl. No.: 16/538,742

(22) Filed: Aug. 12, 2019

(65) Prior Publication Data
US 2020/0053047 A1 Feb. 13, 2020

Related U.S. Application Data

(60) Provisional application No. 62/717,794, filed on Aug. 11, 2018.

(51) Int. Cl.
*H04L 61/2592* (2022.01)
*H04W 72/04* (2009.01)
*H04L 45/00* (2022.01)
*H04L 12/66* (2006.01)
*H04L 61/5007* (2022.01)

(52) U.S. Cl.
CPC .......... *H04L 61/2592* (2013.01); *H04L 12/66* (2013.01); *H04L 45/72* (2013.01); *H04L 61/5007* (2022.05); *H04W 72/04* (2013.01)

(58) Field of Classification Search
CPC ............. H04L 61/2592; H04L 61/2007; H04L 61/2514; H04L 61/2535; H04L 45/72; H04L 12/66; H04W 72/04
See application file for complete search history.

(56) References Cited

U.S. PATENT DOCUMENTS

| | | | | |
|---|---|---|---|---|
| 7,764,692 B1 * | 7/2010 | Bhatnagar | ............... | H04L 45/00 370/392 |
| 8,259,571 B1 * | 9/2012 | Raphel | ................ | H04L 61/2535 370/252 |
| 8,462,696 B2 * | 6/2013 | Vesterinen | ............ | H04W 8/082 370/328 |
| 9,204,336 B2 * | 12/2015 | Mihaly | ............. | H04L 29/12367 |

(Continued)

FOREIGN PATENT DOCUMENTS

WO 2018104769 A1 6/2018

OTHER PUBLICATIONS

Intel: Dynamic Device Personalization Guide: Intel® Ethernet 700 Series Controller—GTPv1 Profile, 2018.
(Continued)

*Primary Examiner* — Saumit Shah
(74) *Attorney, Agent, or Firm* — Michael Y. Saji; David W. Rouille

(57) ABSTRACT

Systems, methods and computer software are disclosed for providing network address translation with a tunnel identifier (TEID) in a cellular network. A HetNet Gateway (HNG) allocates at least a portion of a unique TEID for a user equipment (UE). The HNG receives a packet having a source field in the packet header including an Internet Protocol (IP) address. The HNG replaces the IP address in a source field of the packet header of the packet with the unique TEID for the UE and forwards the packet using the unique TEID to a packet gateway (PGW).

18 Claims, 9 Drawing Sheets

(56) References Cited

U.S. PATENT DOCUMENTS

| | | | |
|---|---|---|---|
| 9,241,255 B2* | 1/2016 | Vesterinen | H04W 8/082 |
| 2006/0013211 A1* | 1/2006 | Deerman | H04L 61/00 |
| | | | 370/389 |
| 2008/0285492 A1* | 11/2008 | Vesterinen | H04W 8/082 |
| | | | 370/310 |
| 2011/0090815 A1* | 4/2011 | Gundavelli | H04L 12/4633 |
| | | | 370/253 |
| 2011/0235595 A1* | 9/2011 | Mehta | H04W 8/082 |
| | | | 370/329 |
| 2012/0257628 A1* | 10/2012 | Bu | H04L 45/00 |
| | | | 370/392 |
| 2012/0300650 A1* | 11/2012 | Claudius | H04L 61/2535 |
| | | | 370/252 |
| 2014/0064246 A1* | 3/2014 | Baillargeon | H04L 61/2592 |
| | | | 370/331 |
| 2014/0153489 A1* | 6/2014 | Perras | H04W 60/00 |
| | | | 370/328 |
| 2014/0223541 A1* | 8/2014 | Yoon | H04L 63/0272 |
| | | | 726/15 |
| 2015/0181459 A1* | 6/2015 | Zhu | H04L 65/80 |
| | | | 370/236 |
| 2015/0223284 A1* | 8/2015 | Jain | H04J 11/00 |
| | | | 370/329 |
| 2015/0289303 A1* | 10/2015 | Zhang | H04L 69/22 |
| | | | 370/328 |
| 2016/0156753 A1* | 6/2016 | Gulbani | H04L 69/325 |
| | | | 370/474 |
| 2016/0192266 A1* | 6/2016 | Dai | H04W 36/22 |
| | | | 370/331 |
| 2017/0026774 A1* | 1/2017 | Koshimizu | H04W 4/70 |
| 2018/0034770 A1* | 2/2018 | Rajagopalan | H04L 41/0806 |
| 2018/0139651 A1* | 5/2018 | Kim | H04L 29/12 |
| 2018/0205732 A1* | 7/2018 | Zhang | H04L 63/0876 |
| 2019/0045357 A1* | 2/2019 | Cooper | H04L 45/50 |

OTHER PUBLICATIONS

"Configuring Dynamic Addressing on the GGSN", Chapter 13. Cisco GGSN Release 10.0 Configuration Guide, Cisco IOS Release 12.4(24).

"Random technical bits and thoughts: eNodeB and IPsec". http://netsecinfo.blogspot.com/2010/09/enodeb-and-ipsec.html, Sep. 26, 2010.

Korhonen et al. "Deploying IPv6 in 3GPP Networks: Evolving Mobile Broadband from 2G to LTE and Beyond", Apr. 2013, page numbers unknown, https://books.google.co.in/books?id=fml06QWRJXQC&dq=ip+overlapping+APN&sitesec=reviews.

* cited by examiner

NETWORK ADDRESS TRANSLATION WITH TEID

CROSS-REFERENCE TO RELATED APPLICATIONS

This application claims priority under 35 U.S.C. § 119(e) to U.S. Provisional Pat. App. No. 62/717,794, filed Aug. 11, 2018, titled "Network Address Translation with TEID," which is hereby incorporated by reference in its entirety for all purposes. This application also hereby incorporates by reference U.S. patent application Ser. No. 15/241,060, entitled "Cell ID Disambiguation" and filed Aug. 18, 2016, which itself is a non-provisional conversion of, and claims the benefit of priority under 35 U.S.C. § 119(e) to U.S. Provisional Pat. App. No. 62/206,666, filed Aug. 18, 2015 with title "Cell ID Disambiguation," each hereby incorporated by reference in its entirety. As well, U.S. Pat. No. 8,867,418 and U.S. Pat. App. No. 20140133456 are also hereby incorporated by reference in their entireties. The present application hereby incorporates by reference U.S. Pat. App. Pub. Nos. US20110044285, US20140241316; WO Pat. App. Pub. No. WO2013145592A1; EP Pat. App. Pub. No. EP2773151A1; U.S. Pat. No. 8,879,416, "Heterogeneous Mesh Network and Multi-RAT Node Used Therein," filed May 8, 2013; U.S. Pat. No. 8,867,418, "Methods of Incorporating an Ad Hoc Cellular Network Into a Fixed Cellular Network," filed Feb. 18, 2014; U.S. patent application Ser. No. 14/777,246, "Methods of Enabling Base Station Functionality in a User Equipment," filed Sep. 15, 2016; U.S. patent application Ser. No. 14/289,821, "Method of Connecting Security Gateway to Mesh Network," filed May 29, 2014; U.S. patent application Ser. No. 14/642,544, "Federated X2 Gateway," filed Mar. 9, 2015; U.S. patent application Ser. No. 14/711,293, "Multi-Egress Backhaul," filed May 13, 2015; U.S. Pat. App. No. 62/375,341, "S2 Proxy for Multi-Architecture Virtualization," filed Aug. 15, 2016; U.S. patent application Ser. No. 15/132,229, "Max-Mesh: Mesh Backhaul Routing," filed Apr. 18, 2016, each in its entirety for all purposes respectively. This application also hereby incorporates by reference in their entirety each of the following U.S. Pat. applications or Pat. App. Publications: US20150098387A1 (PWS-71731US01); US20170055186A1 (PWS-71815US01); US20170273134A1 (PWS-71850US01); US20170272330A1 (PWS-71850US02); and Ser. No. 15/713,584 (PWS-71850US03).

BACKGROUND

Network Address Translation (NAT) is a method of remapping one Internet Protocol (IP) address space into another by modifying network address information in the IP header of packets while they are in transit across a traffic routing device. With NAT, all communications sent to external hosts actually contain the external IP address and port information of the NAT device instead of internal host IP addresses or port numbers. The technique was originally used as a shortcut to avoid the need to readdress every host when a network was moved. It has become a popular and essential tool in conserving global address space in the face of IPv4 address exhaustion. One Internet-routable IP address of a NAT gateway can be used for an entire private network.

A NAT device is similar to a phone system at an office that has one public telephone number and multiple extensions. Outbound phone calls made from the office all appear to come from the same telephone number. However, an incoming call that does not specify an extension cannot be transferred to an individual inside the office. In this scenario, the office is a private LAN, the main phone number is the public IP address, and the individual extensions are unique port numbers.

SUMMARY

Disclosed is Public IP management for User Equipment using some part or whole of GTPU Tunnel Identifier at NodeB, eNodeB, etc. for ePDG, local breakout (LBO) or at PGW.

A mechanism is disclosed to manage public IPs needed for any User Equipment (UE) accessing the Internet. In the 3GPP world, PGW can assign same IP to multiple UEs. eNodeB and NodeB have to deal with the overlapping IP or address collision problem for LBO of such UEs. Assigning public IP to such UEs need a mechanism which will uniquely identify a UE from other. This mechanism provides a method of using some part or whole of GTPU tunnel identifier to determine the public IP given to any UE. PGW/ePDG/HetNetGW in case of LBO allocates GTPU TEID in such a way that it can be used to uniquely identify an UE.

Systems and methods for network address translation with a tunnel endpoint identifier (TEID) in a cellular network are described. In one embodiment, a method may be disclosed which includes allocating, by a HetNet Gateway (HNG), at least a portion of a unique TEID for a user equipment (UE). The method further includes receiving, at the HNG, a packet having a source field in the packet header including an Internet Protocol (IP) address. The method also includes replacing, by the HNG, the IP address in a source field of the packet header of the packet with the unique TEID for the UE; and forwarding the packet using the unique TEID.

In another example embodiment, a system for providing network address translation with a tunnel endpoint identifier (TEID) in a cellular network includes a gateway and a User Equipment (UE) in wireless communication with the gateway. The gateway is disposed between a radio access network and a cellular core network. The gateway allocates at least a portion of a unique TEID for a user equipment (UE), wherein the gateway receives a packet having a source field in the packet header including an Internet Protocol (IP) address, replaces the IP address in a source field of the packet header of the packet with the unique TEID for the UE, and forwards the packet using the unique TEID.

In another example embodiment, a non-transitory computer-readable medium contains instructions for providing network address translation with a tunnel endpoint identifier (TEID) in a cellular network which, when executed, cause a gateway to perform steps including: allocating at least a portion of a unique TEID for a user equipment (UE); receiving a packet having a source field in the packet header including an Internet Protocol (IP) address; replacing the IP address in a source field of the packet header of the packet with the unique TEID for the UE; and forwarding the packet using the unique TEID.

DETAILED DESCRIPTION

Figure 1:
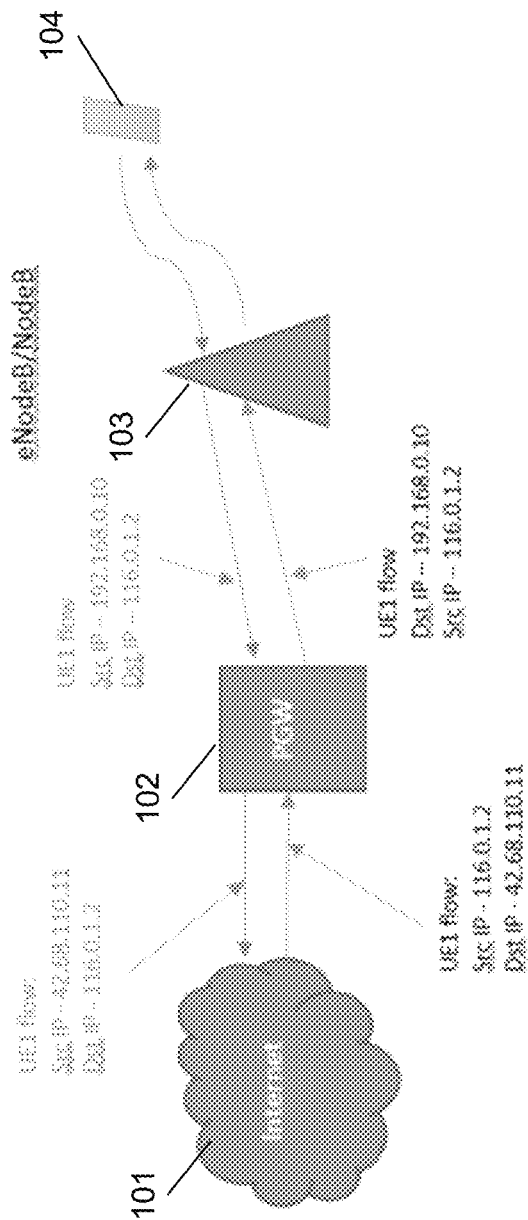
FIG. 1 is a system diagram showing conventional NAT.

Further relating to NAT, the simplest type of NAT provides a one-to-one translation of IP addresses. RFC 2663 refers to this type of NAT as basic NAT; it is often also called a one-to-one NAT. In this type of NAT, only the IP addresses, IP header checksum and any higher level checksums that include the IP address are changed. Basic NATs can be used to interconnect two IP networks that have incompatible addressing.

As an example of simple NAT, when a computer on the private (internal) network sends an IPv4 packet to the external network, the NAT device replaces the internal IP address in the source field of the packet header (sender's address) with the external IP address of the NAT device. Port Address translation (PAT) may then assign the connection a port number from a pool of available ports, inserting this port number in the source port field (much like the post office box number), and forwards the packet to the external network. The NAT device then makes an entry in a translation table containing the internal IP address, original source port, and the translated source port. Subsequent packets from the same connection are translated to the same port number. The computer receiving a packet that has undergone NAT establishes a connection to the port and IP address specified in the altered packet, oblivious to the fact that the supplied address is being translated (analogous to using a post office box number). A packet coming from the external network is mapped to a corresponding internal IP address and port number from the translation table, replacing the external IP address and port number in the incoming packet header (similar to the translation from post office box number to street address). The packet is then forwarded over the inside network. Otherwise, if the destination port number of the incoming packet is not found in the translation table, the packet is dropped or rejected because the NAT device doesn't know where to send it.

GPRS Tunneling Protocol (GTP) is a group of IP-based communications protocols used to carry IP within GSM, UMTS, LTE, and 5G networks. In 3GPP architectures, GTP and Proxy Mobile IPv6 based interfaces are specified on various interface points. The GTP-U protocol is a subset of GTP used for carrying user data within the GPRS core network and between the radio access network and the core network. The user data transported can be packets in any of IPv4, IPv6, or PPP formats. GTP-U is, in effect, a relatively simple IP based tunneling protocol which permits many tunnels between each set of end points. When used in the UMTS, each subscriber will have one or more tunnel, one for each PDP context that they have active, as well as possibly having separate tunnels for specific connections with different quality of service requirements.

In GTP-U, the separate tunnels are identified by a TEID (Tunnel Endpoint Identifier) in the GTP-U messages, which may be a dynamically allocated random number. If this random number is of cryptographic quality, then it will provide a measure of security against certain attacks. (Even so, the requirement of the 3GPP standard is that all GTP traffic, including user data should be sent within secure private networks, not directly connected to the Internet.) This happens on UDP port 2152. The GTPv1-U protocol is used to exchange user data over GTP tunnels across the Sx interfaces. An IP packet for a UE is encapsulated in an GTPv1-U packet and tunneled between the P-GW and the eNodeB for transmission with respect to a UE over S1-U and S5/S8 interfaces. In GTP, starting with version 1, a tunnel endpoint identifier (TEID) is used to multiplex multiple connections in the same GTP tunnel. A single 32-bit field is used. In GTP v2, a flag is used to optionally indicate the presence of the TEID field. Unlike private IP (which is an end-to-end construct), TEID is more analogous to the label used in MPLS, segment wise locally unique and also is uni-directional.

Existing Network Address Translation modules map private IP to a public IP. Address translations can be aided with port translation (PT). As illustrated in FIG. 1, UE1 104 gets some private IP from PGW 102 via eNodeB/NodeB 103. When the UE communicates with Internet 101, the private IPs are mapped to one or more public IPs. Packets from UE1 go onto the Internet as packets coming from 42.68.110.11 and the packets from the Internet are sent with 42.68.110.11 as the destination, but NAT is performed at the PGW 102 and the packets are remapped to UE 1's correct destination IP, 192.168.0.10, before being routed through eNodeB 103.

One problem associated with conventional NAT is that the existing mechanism mandates each UE to have a unique IP. PGW can assign same IP addresses to multiple UEs in the case that the UEs connect via separate APNs (Access Point Names, which are gateways between the cellular network and another IP network, typically the Internet). Address collisions or IP overlapping will lead to ambiguous system where distinctively identifying a UE is not possible. Standard Network Address Translation rules fail in this situation. In such cases, Additional information apart from IP is needed to identify the UE. This leads to two factors determination of the UE. If there is a method in which an UE can be uniquely identified by only one factor, it would lead to computation efficient processing of UE packets thus improving throughput.

Each APN has its own address pool. For example there can be two APNs one addressing IMS-Core and one handling network core. Suppose one UE makes a call and other UE connects to the Internet. Each APN allocates unique IP in its pool. Two APNs can allocate same IP to these different UEs. When PGW has multiple APN support, IPs can get overlapped. As well, in case of local breakout (LBO), the eNodeB/NodeB does not control the IP allocation done at PGW. These nodes can also face address collision.

It is difficult to use the PGW to ensure unique private IP allocation per UE because APNs allocate IP for UE in PGW. Allotting separate IP pools per APN is not scalable. For LBO, the eNodeB/NodeB ends up having a UE which can talk to multiple PGWs.

As an example, for a UE to reach public network, it needs to have a public IP. This is achieved using NAT (Network Address Translation) rules. NAT rules maps private IPs to public IPs. For example, if PGW has assigned an IP of 192.168.56.2 to a UE. The UE wants to reach google.com. The eNodeB/TWANGW (in case of LBO) or PGW will map this IP to a public IP, say 10.10.36.45. Similarly, the packets coming from google are reverse NAT-ed to private IP when forwarding the packets from google.com to UE. UE trying to reach google.com, Internet, eNodeB LBO/TWANGW LBO/PGW with NAT, UE IP (10.10.36.45), UE IP (192.168.56.2). For the above to work, it is important for each UE to have a unique private IP address. But it can happen that two UEs get the same IP from PGW. Standard NAT rules cannot be applied in such case.

Solution to Problem

Every UE needs to be uniquely identified by some parameter other than IP. The 32 bit GTPU tunnel endpoint identifier (TEID) allocated to every UE can serve the purpose. If not the entire 32 bits, a portion of it can be used to identify an UE. This TEID or part of TEID can be mapped to public IP, hence solving the address collision or overlapping problem. One can use TEID in GTPU header to map a private IP of an UE to Public IP.

When we get a packet, we have no idea how to figure out to whom this packet belongs and we have only these 4 bytes (the TEID). One way to do this would be to introduce proprietary headers or information elements. Instead, one of the key ideas is to create a mapping from received TEID to the UE in some way. We do this with SPI as follows.

Outer: Src IP 1, Dst IP 1 (our ePDG IP), SPI||Inner: Src IP 2 (PGW provided that is allocated from a pool for a particular APN and is unique per UE for that APN but cannot be unique across APNs; two PGWs can allocate the same IP; not under our control), Dst IP 2 (this is the destination of the UE's message, e.g., yahoo.com)

At a stream level, the stream is per UE and the Dest IP 2 will change based on user activity.

Initially when the UE attaches, it does an IKE handshake, and this identifies the SPI. Generated by ePDG. There are two SPIs. Receiver SPI for ePDG, sender SPI for UE. There are thus two TEIDs. One for sender and one for receiver.

IKE key exchange happens between UE and ePDG. SPI is generated at the ePDG. TEID is unique and is determined by the handshake with the PGW and ePDG. TEID is part of the GTP standard header. Tunnel endpoint identifier.

We can allocate GTPU TEID in such a way that it can be used to uniquely identify an UE. One option is to use some part, for example, 24 bits of GTPU TEID to identify UE. For PGW we could use 29 bits. Total 32 bits are available. More bits can be used simply to increase the number of UEs that can be supported.

Another way to do this would be to create a state table and map using the source IPs.

In the case of a UE being served by the PGW, a unique public IP is identified for the PGW, and it is mapped to the UE TEID.

Figure 2:
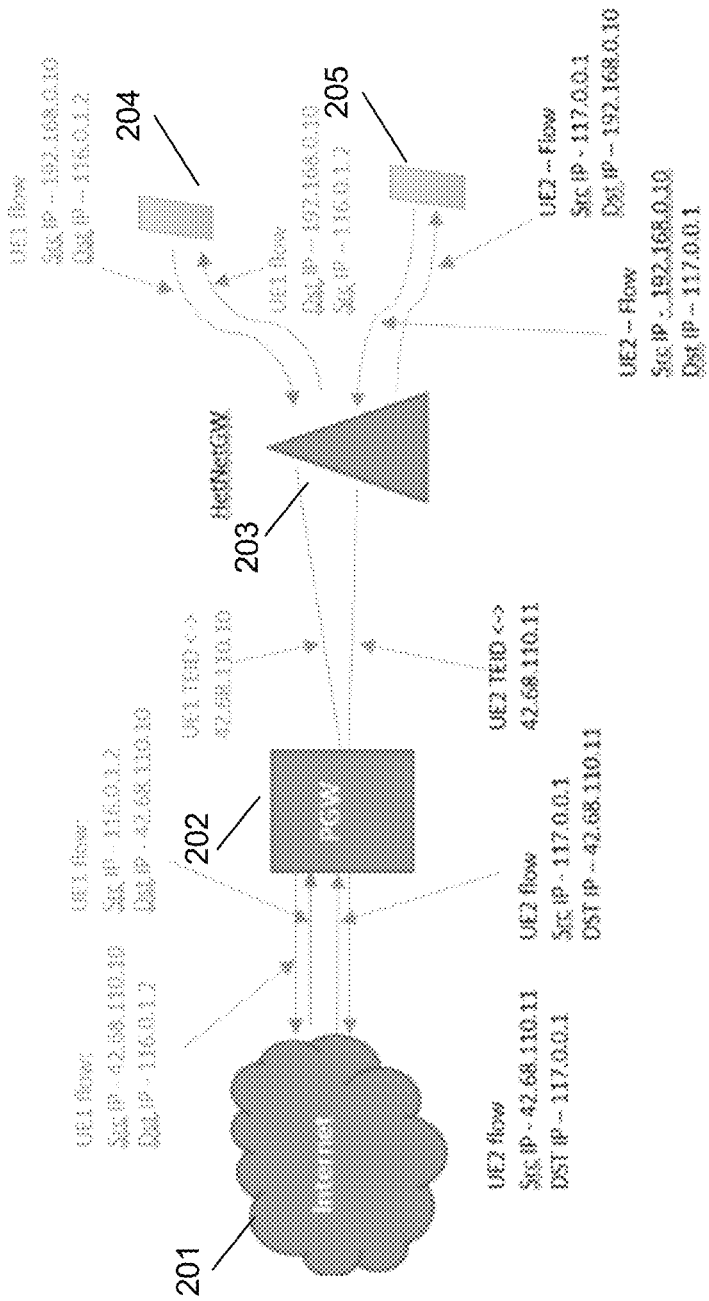
FIG. 2 is a system diagram showing the use of TEID to manage NAT, in accordance with some embodiments.

As shown in FIG. 2, an environment includes the Internet 201, a PGW 202, a HetNet Gateway 203, a first UE 204, and a second UE 205. The HetNet Gateway 203 is a gateway that is situated between the radio access network (here, not shown) and the core network (here, PGW 202), that can also provide a number of additional features, such as: SON; RAN virtualization; core virtualization; signaling reduction; routing and gateway functions; caching and proxying for various interfaces and protocols, etc., as described further herein and in the documents incorporated by reference hereunto. The PGW allocates a unique TEID (part or full) for every UE, be it TWAG/3G/4G/ePDG UE, and sets up GTP tunnels, which are terminated at the HNG. The HNG therefore has the TEID for each tunnel and each UE. It follows that translation of private UE IP to Public IP and reverse translation becomes straightforward. This enables single-factor identification of the UE and its IPsec tunnel, as well as resolving IP overlaps at the ePDG, using the TEID issued for the GTP tunnel.

The inventors have appreciated that this technique can be used using any tunnel identifier, not just TEID, and that these tunnel identifiers can be used to perform NAT target identification in a variety of scenarios. The termination at the HNG of both IPsec and GTP tunnels helpfully enables this identification and the creation of a mapping at the HNG.

In the prior art, when considering multiple PGWs, it is difficult to ensure unique private IP address. And for LBO, the eNodeB/NodeB end up having UE which can talk to multiple PGW. APNs allocate IP for UE in PGW. Allotting separate IP pools per APN is not scalable. But it's difficult to ensure unique TEID assignment as well. The inventors have noted that TEID in GTPU packet coming from PGW is decided by eNodeB or NodeB. Hence these nodes can allocate unique TEIDs and use it to identify the UE, in some embodiments. TEID allocation can be at the eNodeB or gateway or HNG, in some embodiments. When multiple nodes are involved in allocation, they may communicate to ensure effective allocation, in some embodiments.

Figure 3:
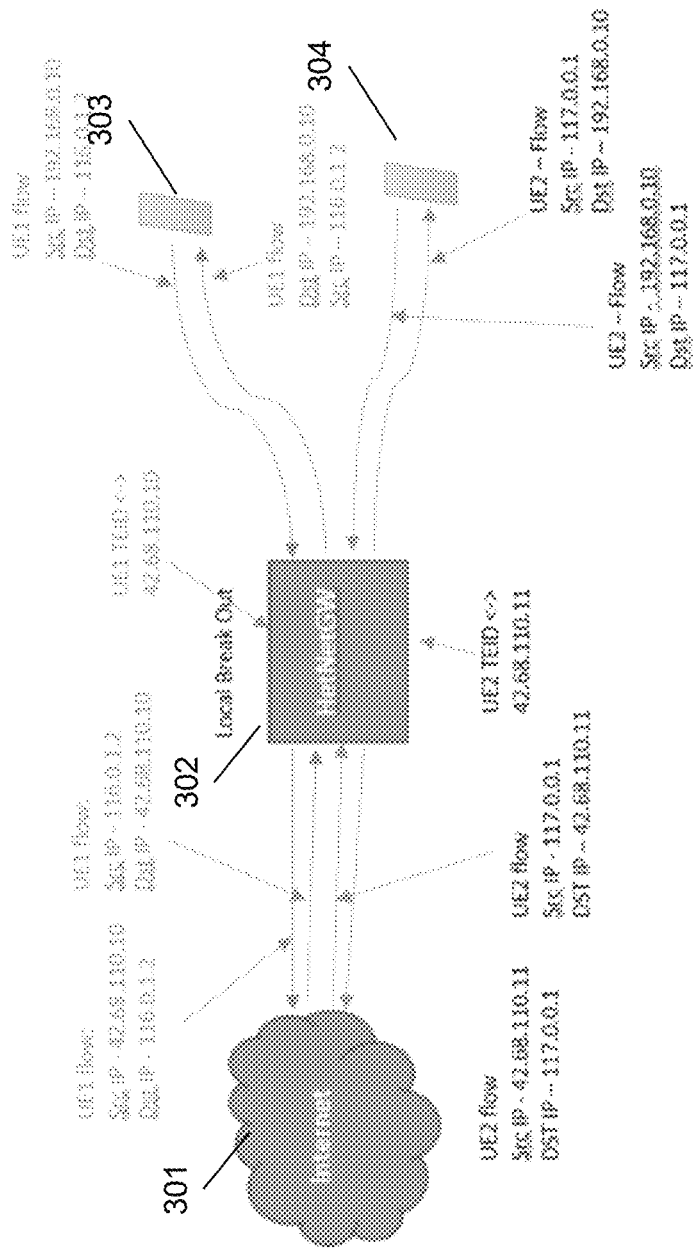
FIG. 3 is a system diagram showing an HNG using TEID to manage NAT, in accordance with some embodiments.

As shown in FIG. 3, an HNG 302 is in communication with the Internet 301, and also with first UE 304 and second UE 305. In LBO, the HNG can use part or whole of GTPU TEID to identify 3G/4G UE and translate the private IP allotted by PGW to a public IP. The TEID in GTPU packet coming from PGW is decided by eNodeB or NodeB. Hence these nodes can allocate unique TEIDs and use it to identify the UE. In LBO, the TEID is used from the GTPU packet coming from the access network (CWS or cell). The TEID can be allocated by the network node that is managing the mapping, e.g., could be the CWS/eNB/nodeB, or could be the HNG. Local breakout is possible without the PGW.

In some cases, a PGW may allocate same IP to multiple UEs; this is not a completely uncommon practice. This results in a naïve node not being able to distinguish two UEs by IP. Using the idea disclosed herein, it is possible to allow the PGW to continue to allocate the same IP to two UEs as long as the special node that is managing the mapping allocates a distinct TEID or other identifier for each UE. The specially-equipped node that is disambiguating the UE using the TEID would thus be able to permit the PGW to continue re-using IPs.

It is also possible to use this technique at a PGW in a network, or indeed at any gateway in a network that is the gateway to an external packet data network. With namespaces, a PGW can allocate a single IP to two UEs. For example, a UE connecting to the Internet can use a first APN and a UE making a call can use a second APN. But these UEs can get the same IP. This is called IP overlapping. To uniquely identify the UE, we can have unique TEIDs.

The mappings can be maintained at the PGW for the case where this technique is used at a PGW in a network. Alternatively, the mappings can be maintained at an eNodeB or base station (or AP) in cases where we would implement local breakout. This would be the case where we provide virtual eNodeB or nodeB at the HNG (the cloud coordination gateway further characterized by the documents incorporated by reference herein).

This technique can be used with ePDG tunnels as well as with PGW tunnels. In an ePDG case, a UE IPsec tunnel can be mapped to a UE GTPU tunnel as described herein. For ePDG, the UE is directly connected to ePDG over an IPsec tunnel. PGW can give the same IP to two UEs, but the IPsec tunnel is or can be made unique for a UE. GTPU TEID is used to map the IPsec tunnel for the UE. This is done to provide one-factor identification of UE and its IPsec tunnel; and to resolve IP overlapping in the ePDG. In the case of the ePDG, the mapping may be maintained at the ePDG, in some embodiments. For IPsec<->TEID to identify UE, the mapping can be maintained at an ePDG. In the case where the public IP is used, performing NAT at the eNodeB and using the mapping at the ePDG can decrease latency and increase performance.

This technique can be performed at any gateway node in the core network, including at the PGW, if the TEID is available. For example, the TEID can be shared via messaging to gateway nodes in the core network to enable NAT to be performed at various gateways, for example for offload purposes. This technique can be used at any gateway node in the RAN provided that the IP is able to be properly routed and that the TEID is available, however, in some cases the inability to perform routing will restrict the availability of this technique.

The TEID in GTP packet coming from PGW (for ePDG) or access (for LBO) is decided by eNB or NodeB, in some embodiments. In the local breakout (LBO) scenario, a public IP is used to send and receive certain streams to the Internet without using a PGW. ePDG has inner and outer IP addresses because each IPsec packet has inner and outer packets.

Figure 4:
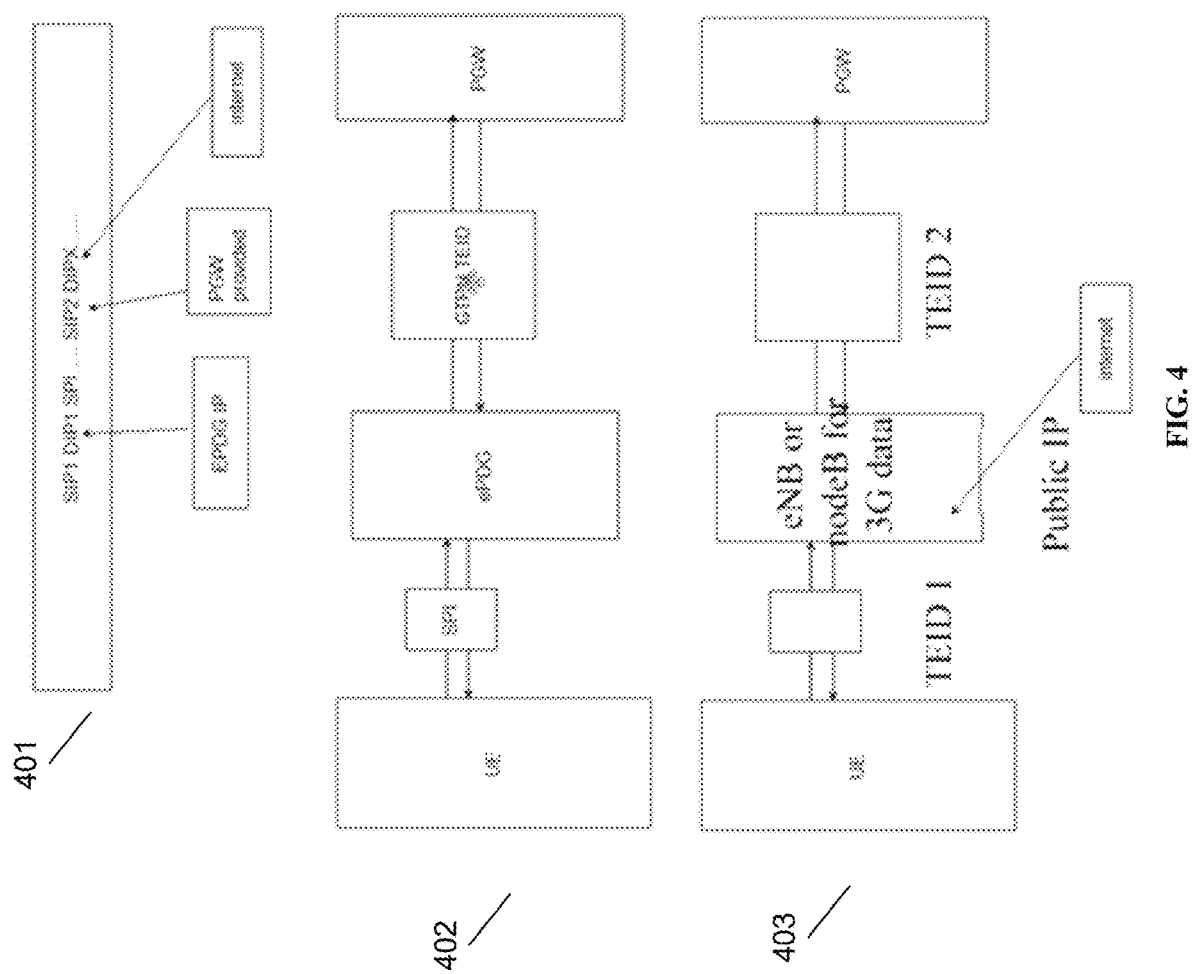
FIG. 4 is a system diagram showing an eNodeB using TEID to manage NAT, in accordance with some embodiments.

As shown in FIG. 4, in the case of a UE being served by an ePDG, all IPs are private so there is no need for a private IP. We have unique tunnels for each UE. At 401, a schematic diagram of a tunnel is shown, including source IPs SIP 1, SIP 2, etc. and destination IP DIP 1, DIP X, along with, where appropriate, an SPI. Tunnel 401 is composed of two sub-tunnels, one incoming and one outgoing. ePDG has inner and outer IP addresses because each IPsec packet has inner and outer packets. Outer: Src IP 1, Dst IP 1 (our ePDG IP), SPI. Inner: Src IP 2 (PGW provided that is allocated from a pool for a particular APN and is unique per UE for that APN but cannot be unique across APNs; two PGWs can allocate the same IP; not under our control), Dst IP 2 (this is the destination of the UE's message, e.g., yahoo.com and will change based on user activity). At a stream level, the stream is per UE. The incoming tunnel's SPI (security parameter index, which is a tunnel identifier) is allocated by the receiver, sent to the access side. As this is under our control, we can allocate it uniquely for every UE. If we allocate this per user to be unique, then we don't need to check to ensure non-overlapping IPs.

Any ePDG will use IPsec tunnel. At 402, the scenario is shown for the use of a UE with an ePDG and an IPsec tunnel, shown with its SPI. There is a separate GTP tunnel between the ePDG and the PGW; this tunnel has a GTPU TEID. At 403, the tunnel IDs are shown as TEID 1, between the UE and the eNodeB, and TEID 2 for the GTPU TEID. In some embodiments SPI can used in place of TEID 1. The eNodeB can route data via LBO to the Internet. TEID is used at the eNodeB for NAT for TEID 1 for traffic going to and from the Internet. IKE key exchange happens between UE and ePDG. SPI is generated at the ePDG. TEID is unique and is determined by the handshake with the PGW and ePDG. TEID is part of the GTP standard header.

Figure 5A:
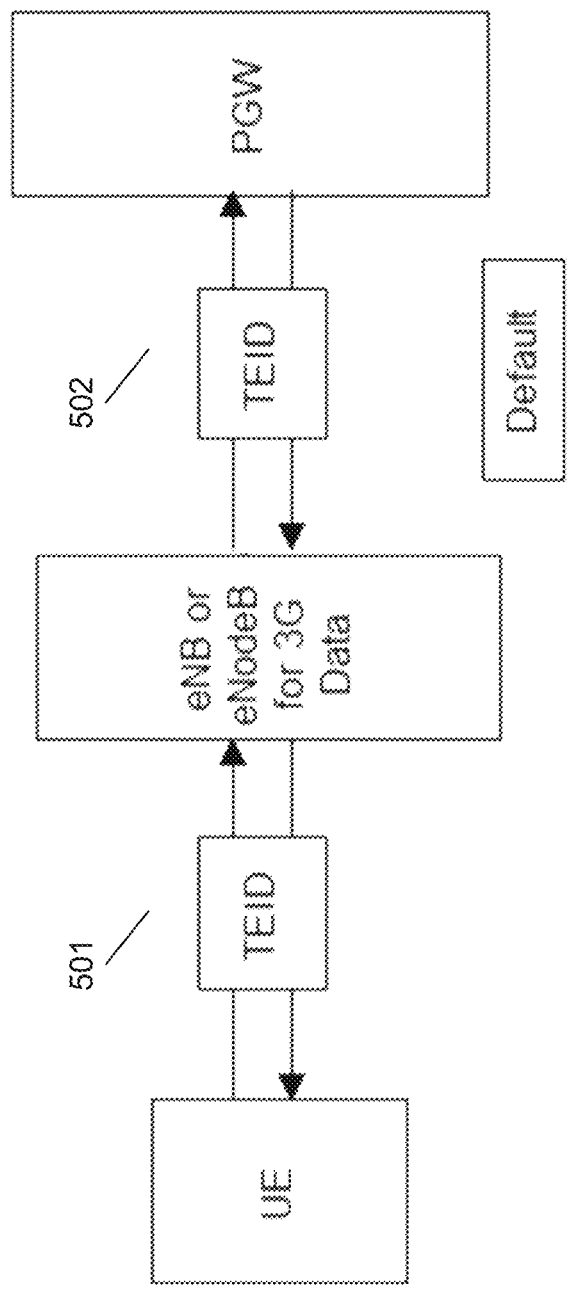
FIGS. 5A and 5B are system diagrams showing an eNodeB using TEID for a UE and a PGW, in accordance with some embodiments.
Figure 5B:
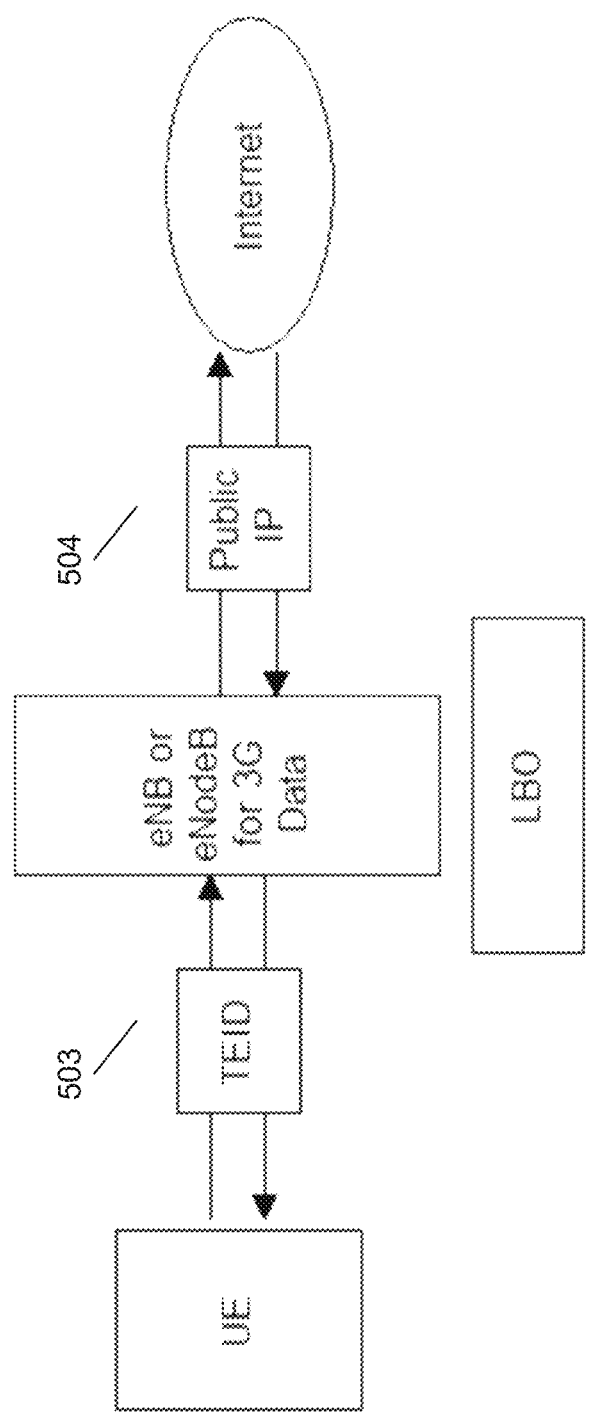

In the case of 2G, 3G, 5G, any other RAT, etc., as shown in FIGS. 5A and 5B IP can be delivered using local breakout, which is a similar scenario. The eNodeB for performing LBO is a gateway/router. The eNB generates the TEID. Typically the IP cannot be used for mapping because in some cases the same IP can be granted to two UEs. But to provide a mapping, the TEID of the UE is mapped to/from a publicly-accessible IP and port. The TEID in GTP packet coming from PGW (for ePDG) or access (for LBO) is decided by eNB or NodeB. In FIG. 5A, the non-LBO scenario is shown and a single TEID 501, 502 is used for a tunnel from the UE through to the PGW, with NAT being performed at the HNG (not shown; between the eNodeB and the PGW) or at the eNodeB, using the TEID. In FIG. 5B, the LBO scenario is shown. A TEID 503 is available for use between the eNB and the UE, but NAT must be performed at the eNodeB to translate the TEID to/from a public IP 504.

Figure 6:
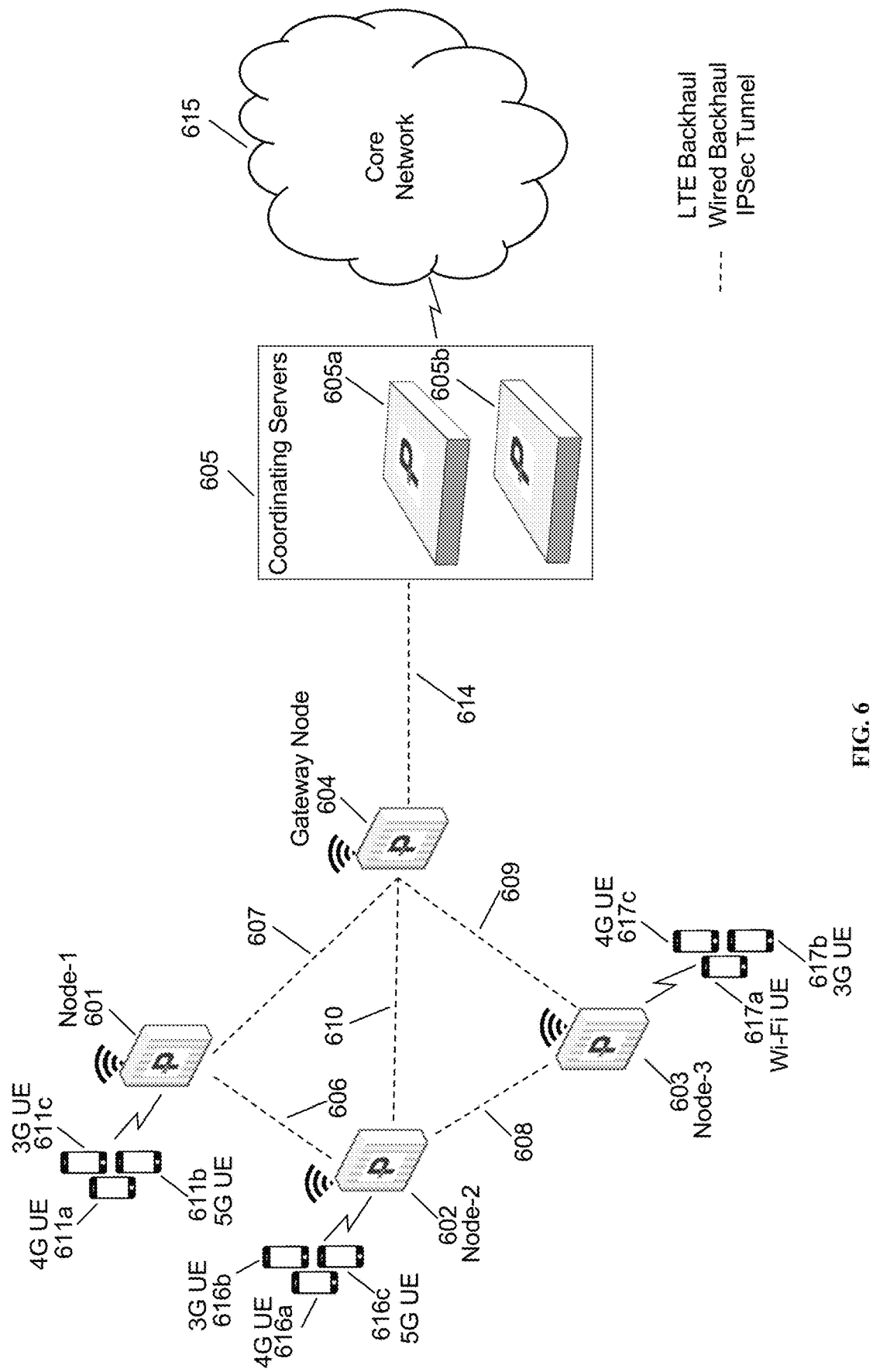
FIG. 6 is a network diagram in accordance with some embodiments.

FIG. 6 is a network diagram in accordance with some embodiments. In some embodiments, as shown in FIG. 6, a mesh node 1 601, a mesh node 2 602, and a mesh node 3 603 are any G RAN nodes. Base stations 601, 602, and 603 form a mesh network establishing mesh network links 606, 607, 608, 609, and 610 with a base station 604. The mesh network links are flexible and are used by the mesh nodes to route traffic around congestion within the mesh network as needed. The base station 604 acts as gateway node or mesh gateway node, and provides backhaul connectivity to a core network to the base stations 601, 602, and 603 over backhaul link 614 to a coordinating server(s) 605 and towards core network 615. The Base stations 601, 602, 603, 604 may also provide eNodeB, NodeB, Wi-Fi Access Point, Femto Base Station etc. functionality, and may support radio access technologies such as 2G, 3G, 4G, 5G, Wi-Fi etc. The base stations 601, 602, 603 may also be known as mesh network nodes 601, 602, 603.

The coordinating servers 605 are shown as two coordinating servers 605a and 605b. The coordinating servers 605a and 605b may be in load-sharing mode or may be in active-standby mode for high availability. The coordinating servers 605 may be located between a radio access network (RAN) and the core network and may appear as core network to the base stations in a radio access network (RAN) and a single eNodeB to the core network, i.e., may provide virtualization of the base stations towards the core network. As shown in FIG. 6, various user equipments 611a, 611b, 611c are connected to the base station 601. The base station 601 provides backhaul connectivity to the user equipments 611a, 611b, and 611c connected to it over mesh network links 606, 607, 608, 609, 610 and 614. The user equipments may be mobile devices, mobile phones, personal digital assistant (PDA), tablet, laptop etc. The base station 602 provides backhaul connection to user equipments 612a, 612b, 612c and the base station 603 provides backhaul connection to user equipments 613a, 613b, and 613c. The user equipments 611a, 611b, 611c, 612a, 612b, 612c, 613a, 613b, 613c may support any radio access technology such as 2G, 3G, 4G, 5G, Wi-Fi, WiMAX, LTE, LTE-Advanced etc. supported by the mesh network base stations, and may interwork these technologies to IP.

In some embodiments, depending on the user activity occurring at the user equipments 611a, 611b, 611c, 612a, 612b, 612c, 613a, 613b, and 613c, the uplink 614 may get congested under certain circumstances. As described above, to continue the radio access network running and providing services to the user equipments, the solution requires prioritizing or classifying the traffic based at the base stations 601, 602, 603. The traffic from the base stations 601, 602, and 603 to the core network 615 through the coordinating server 605 flows through an IPSec tunnel terminated at the coordinating server 605. The mesh network nodes 601, 602, and 603 adds IP Option header field to the outermost IP Header (i.e., not to the pre-encapsulated packets). The traffic may from the base station 601 may follow any of the mesh network link path such as 607, 606-110, 606-108-109 to reach to the mesh gateway node 604, according to a mesh network routing protocol.

Figure 7:
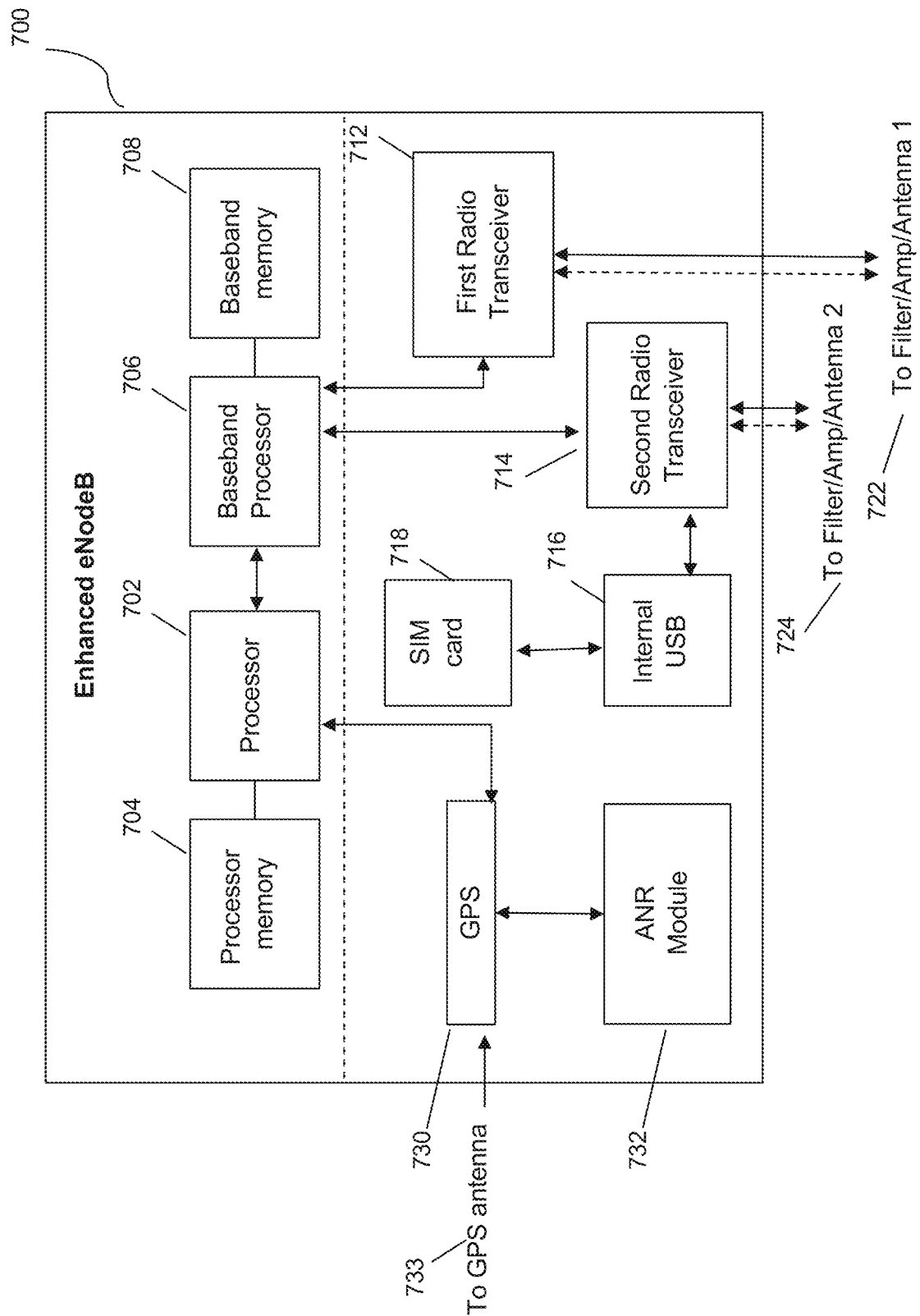
FIG. 7 is an enhanced eNodeB for performing the methods described herein, in accordance with some embodiments.

FIG. 7 is an enhanced eNodeB for performing the methods described herein, in accordance with some embodiments. Mesh network node 700 may include processor 702, processor memory 704 in communication with the processor, baseband processor 706, and baseband processor memory 708 in communication with the baseband processor. Mesh network node 700 may also include first radio transceiver 712 and second radio transceiver 714, internal universal serial bus (USB) port 716, and subscriber information module card (SIM card) 718 coupled to USB port 716. In some embodiments, the second radio transceiver 714 itself may be coupled to USB port 716, and communications from the baseband processor may be passed through USB port 716. The second radio transceiver may be used for wirelessly backhauling eNodeB 700.

Processor 702 and baseband processor 706 are in communication with one another. Processor 702 may perform routing functions, and may determine if/when a switch in network configuration is needed. Baseband processor 706 may generate and receive radio signals for both radio transceivers 712 and 714, based on instructions from processor 702. In some embodiments, processors 702 and 706 may be on the same physical logic board. In other embodiments, they may be on separate logic boards.

Processor 702 may identify the appropriate network configuration, and may perform routing of packets from one network interface to another accordingly. Processor 702 may use memory 704, in particular to store a routing table to be used for routing packets. Baseband processor 706 may perform operations to generate the radio frequency signals for transmission or retransmission by both transceivers 710 and 712. Baseband processor 706 may also perform operations to decode signals received by transceivers 712 and 714. Baseband processor 706 may use memory 708 to perform these tasks.

The first radio transceiver 712 may be a radio transceiver capable of providing LTE eNodeB functionality, and may be capable of higher power and multi-channel OFDMA. The second radio transceiver 714 may be a radio transceiver capable of providing LTE UE functionality. Both transceivers 712 and 714 may be capable of receiving and transmitting on one or more LTE bands. In some embodiments, either or both of transceivers 712 and 714 may be capable of providing both LTE eNodeB and LTE UE functionality. Transceiver 712 may be coupled to processor 702 via a Peripheral Component Interconnect-Express (PCI-E) bus, and/or via a daughtercard. As transceiver 714 is for providing LTE UE functionality, in effect emulating a user equipment, it may be connected via the same or different PCI-E bus, or by a USB bus, and may also be coupled to SIM card 718. First transceiver 712 may be coupled to first radio frequency (RF) chain (filter, amplifier, antenna) 722, and second transceiver 714 may be coupled to second RF chain (filter, amplifier, antenna) 724.

SIM card 718 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 700 is not an ordinary UE but instead is a special UE for providing backhaul to device 700.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 712 and 714, which may be Wi-Fi 702.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 702 for reconfiguration.

A GPS module 730 may also be included, and may be in communication with a GPS antenna 732 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 732 may also be present and may run on processor 702 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 8:
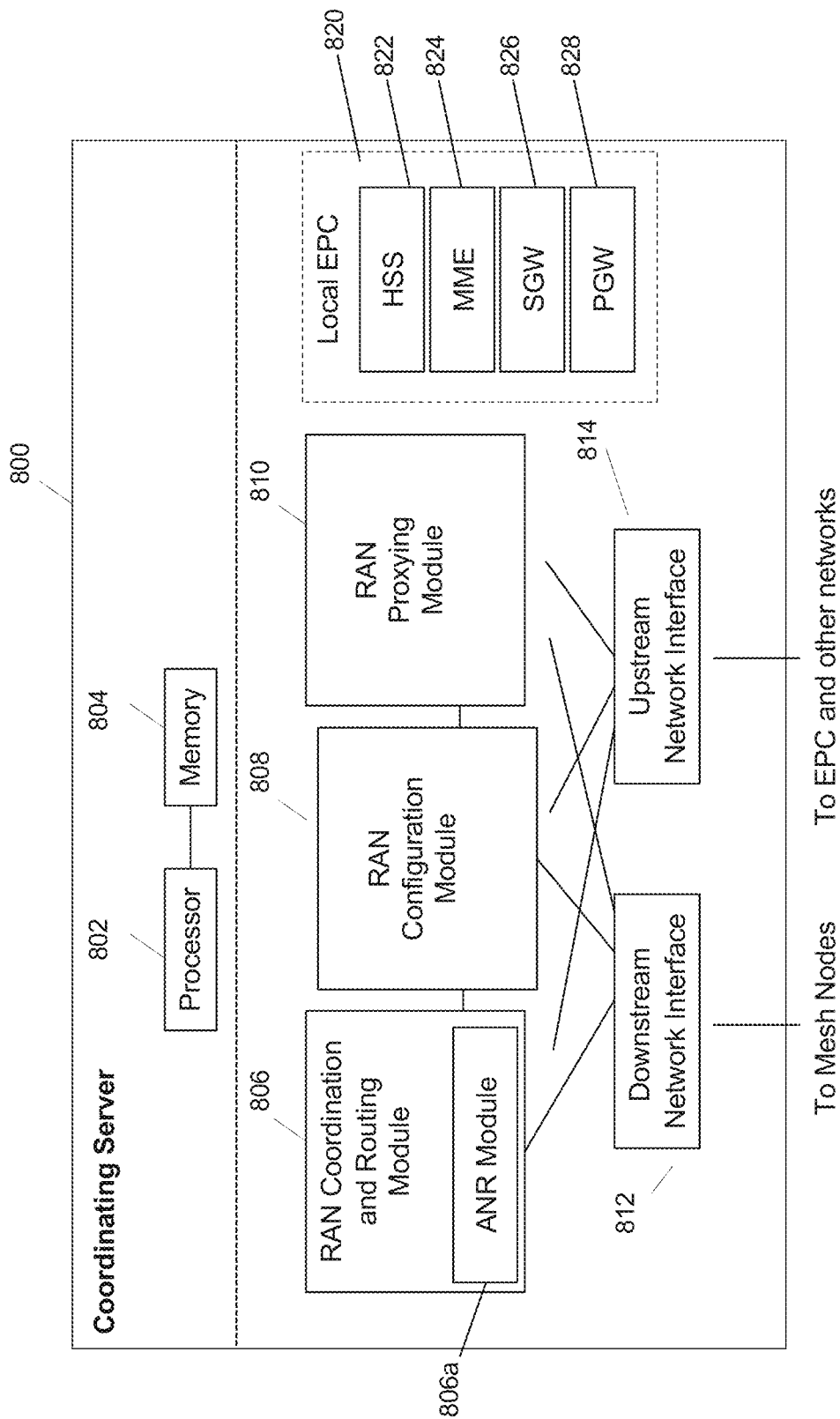
FIG. 8 is a coordinating server for providing services and performing methods as described herein, in accordance with some embodiments.

FIG. 8 is a coordinating server for providing services and performing methods as described herein, in accordance with some embodiments. Coordinating server 800 includes processor 802 and memory 804, which are configured to provide the functions described herein. Also present are radio access network coordination/routing (RAN Coordination and routing) module 806, including ANR module 806a, RAN configuration module 808, and RAN proxying module 810. The ANR module 806a may perform the ANR tracking, PCI disambiguation, ECGI requesting, and GPS coalescing and tracking as described herein, in coordination with RAN coordination module 806 (e.g., for requesting ECGIs, etc.). In some embodiments, coordinating server 800 may coordinate multiple RANs using coordination module 806. In some embodiments, coordination server may also provide proxying, routing virtualization and RAN virtualization, via modules 810 and 808. In some embodiments, a downstream network interface 812 is provided for interfacing with the RANs, which may be a radio interface (e.g., LTE), and an upstream network interface 814 is provided for interfacing with the core network, which may be either a radio interface (e.g., LTE) or a wired interface (e.g., Ethernet).

Coordinator 800 includes local evolved packet core (EPC) module 820, for authenticating users, storing and caching priority profile information, and performing other EPC-dependent functions when no backhaul link is available. Local EPC 820 may include local HSS 822, local MME 824, local SGW 826, and local PGW 828, as well as other modules. Local EPC 820 may incorporate these modules as software modules, processes, or containers. Local EPC 820 may alternatively incorporate these modules as a small number of monolithic software processes. Modules 806,

808, 810 and local EPC 820 may each run on processor 802 or on another processor, or may be located within another device.

Although the above systems and methods are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art. Specifically with relation to 5G, an HNG or gateway can be provided in a 5G network between a 5G RAN and a 5G core, and can perform the same functions as described hereinabove with relation to LTE. Specifically, a gNodeB can provide local breakout and perform the above functions as described hereinabove with relation to LTE. The same architecture can be used for 5G standalone or non-standalone; in the case of 5G non-standalone, the NAT, mapping/demapping, and TEID, etc. identifier assignment functionality can be at the eNodeB, the gNodeB, or both depending on the location of LBO routing and depending on the needs of the operator; at this time it is understood that IP traffic in NSA deployments are expected to pass through the LTE core, and that 5G NR gNBs will connect to the LTE core; in this scenario either the eNB or the gNB may perform LBO.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

The word "cell" is used herein to denote either the coverage area of any base station, or the base station itself, as appropriate and as would be understood by one having skill in the art. For purposes of the present disclosure, while actual PCIs and ECGIs have values that reflect the public land mobile networks (PLMNs) that the base stations are part of, the values are illustrative and do not reflect any PLMNs nor the actual structure of PCI and ECGI values.

In the above disclosure, it is noted that the terms PCI conflict, PCI confusion, and PCI ambiguity are used to refer to the same or similar concepts and situations, and should be understood to refer to substantially the same situation, in some embodiments. In the above disclosure, it is noted that PCI confusion detection refers to a concept separate from PCI disambiguation, and should be read separately in relation to some embodiments. Power level, as referred to above, may refer to RSSI, RSFP, or any other signal strength indication or parameter.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, legacy TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A method for providing network address translation with a tunnel identifier (TEID) in a cellular network, comprising:
   allocating, by a HetNet Gateway (HNG), at least a portion of a unique TEID for a user equipment (UE);
   receiving, at the HNG, a packet having a source field in the packet header including an Internet Protocol (IP) address;
   replacing, by the HNG, the IP address in a source field of the packet header of the packet with the portion of the unique TEID for the UE;
   forwarding the packet using the portion of the unique_TEID to a packet gateway (PGW), wherein the portion of the unique TEID of the UE is mapped to a publicly-accessible IP and port; and
   providing a state table and map using the source IPs of the received packets.

2. The method of claim 1, further comprising:
   receiving, at the PGW, a packet having a source field in the packet header including a TEID for the UE, the packet destined for the UE;
   receiving, at the HNG, the packet from the PGW;
   replacing, by the HNG, the TEID in the source field of the packet header of the packet destined for the UE with the IP address for the UE; and
   forwarding the packet using the IP address in the source field of the packet.

3. The method of claim 1, further comprising performing local breakout (LBO).

4. The method of claim 1, wherein the IP address is allocated to multiple UEs.

5. The method of claim 1, further comprising creating a mapping by the HNG wherein a distinct TEID is mapped for each UE.

6. The method of claim 1 wherein the HNG is a multi-Radio Access Technology (RAT) gateway.

7. The method of claim 1, wherein the HNG supports at least two of 2G, 3G, 4G, and 5G radio access technology.

8. The method of claim 1 further comprising providing a virtual eNodeB or nodeB at the HNG.

9. A system for providing network address translation with a tunnel identifier (TEID) in a cellular network, comprising:
   a HetNet Gateway (HNG);
   a User Equipment (UE) in wireless communication with the HNG;
   wherein the HNG allocates at least a portion of a unique TEID for a user equipment (UE), wherein the HNG receives a packet having a source field in the packet header including an Internet Protocol (IP) address; wherein the HNG replaces the IP address in a source field of the packet header of the packet with the portion of the unique TEID for the UE, and forwards the packet using the portion of the unique TEID to a packet gateway (PGW)), wherein the portion of the unique TEID of the UE is mapped to a publicly-accessible IP and port, and wherein a state table and map using the source IPs of the received packets is provided.

10. The system of claim 9, wherein the HNG receives a packet having a source field in the packet header including a TEID for the UE, the packet destined for the UE; replaces the TEID in the source field of the packet header of the packet destined for the UE with the IP address for the UE; and forwards the packet using the IP address in the source field of the packet.

11. The system of claim 9, wherein local breakout (LBO) is performed.

12. The system of claim 9, wherein the IP address is allocated to multiple UEs.

13. The system of claim 9, wherein the HNG maps a distinct TEID for each UE.

14. The system of claim 9 wherein the HNG is a multi-Radio Access Technology (RAT) gateway.

15. The system of claim 9, wherein the HNG supports at least two of 2G, 3G, 4G, and 5G radio access technology.

16. The system of claim 9 further comprising providing a virtual eNodeB or nodeB at the HNG.

17. A non-transitory computer-readable medium containing instructions for providing network address translation with a tunnel identifier (TEID in a cellular network which, when executed, cause a HetNet Gateway (HNG) to perform steps comprising:
   allocating at least a portion of a unique TEID for a user equipment (UE);
   receiving a packet having a source field in the packet header including an Internet Protocol (IP) address;
   replacing the IP address in a source field of the packet header of the packet with the portion of the unique TEID for the UE;

forwarding the packet using the portion of the unique TEID to a packet gateway (PGW)), wherein the TEID of the UE is mapped to a publicly-accessible IP and port; and providing a state table and map using the source IPs of the received packets.

18. The non-transitory computer-readable medium of claim 17, further comprising instructions for performing steps comprising:

receiving a packet from the PGW;

replacing the TEID in the source field of the packet header of the packet destined for the UE with the IP address for the UE; and forwarding the packet using the IP address in the source field of the packet.

\* \* \* \* \*